US011006166B2

(12) United States Patent
Yu et al.

(10) Patent No.: US 11,006,166 B2
(45) Date of Patent: May 11, 2021

(54) METHOD FOR TELEVISION REMOTE KEYPRESS RESPONSE BASED ON ANDROID OPERATING SYSTEM AND TELEVISION THEREOF

(71) Applicants: Hisense Visual Technology Co., Ltd., Qingdao (CN); HISENSE USA CORPORATION, Suwanee, GA (US); Hisense International Co., Ltd., Qingdao (CN)

(72) Inventors: Hong Yu, Qingdao (CN); Jingjian Wang, Qingdao (CN); Hanyong Wu, Qingdao (CN); Xin Li, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/507,464

(22) Filed: Jul. 10, 2019

(65) Prior Publication Data
US 2019/0335132 A1  Oct. 31, 2019

Related U.S. Application Data

(63) Continuation of application No. 15/387,440, filed on Dec. 21, 2016, now Pat. No. 10,397,511.

(30) Foreign Application Priority Data

Jul. 1, 2016  (CN) .......................... 201610513331.4

(51) Int. Cl.
G06F 3/033  (2013.01)
H04N 21/422  (2011.01)
(Continued)

(52) U.S. Cl.
CPC ..... H04N 21/42204 (2013.01); G06F 3/0482 (2013.01); G06F 3/04817 (2013.01);
(Continued)

(58) Field of Classification Search
CPC .... G06F 3/048; G06F 3/04817; G06F 3/0482; G06F 3/0484; G06F 3/04842; G06F 3/04883
See application file for complete search history.

(56) References Cited

U.S. PATENT DOCUMENTS 8,482,671 B1  7/2013 Chen
8,640,031 B2  1/2014 Kim et al.
(Continued)

FOREIGN PATENT DOCUMENTS

CN  102790918 A  11/2012
CN  102946557 A  2/2013
(Continued)

OTHER PUBLICATIONS

Third Examination Report dated Nov. 4, 2019 (7 pages) from corresponding Chinese application No. 201610513331.4.
(Continued)

Primary Examiner — Vijay Shankar
(74) Attorney, Agent, or Firm — Brinks Gilson & Lione

(57) ABSTRACT

This application provides a method for method for television (TV) remote keypress response based on Android operating system (OS) and a TV thereof, and includes: creating a first process when the Android OS is being initialized; executing the first process to obtain a key value of a remote key event; and performing a remote keypress operation according to the key value. The method creates and executes the first process during the initialization of the Android OS, thereby realizing responding to remote keypress during TV start-up, greatly enhancing user experience.

16 Claims, 6 Drawing Sheets

(51) Int. Cl.
*G06F 3/0484* (2013.01)
*G06F 3/0488* (2013.01)
*G06F 3/0482* (2013.01)
*G06F 3/0481* (2013.01)

(52) U.S. Cl.
CPC ...... *G06F 3/04842* (2013.01); *G06F 3/04883* (2013.01); *H04N 21/42227* (2013.01)

(56) References Cited

U.S. PATENT DOCUMENTS

| | | | |
|---|---|---|---|
| 8,918,719 B2 | 12/2014 | Hilbrink et al. | |
| 10,397,511 B2 * | 8/2019 | Yu | H04N 21/42227 |
| 2009/0298535 A1 | 12/2009 | Klein et al. | |
| 2010/0017736 A1 | 1/2010 | Kim | |
| 2010/0275157 A1 | 10/2010 | Kano et al. | |
| 2012/0210268 A1 | 8/2012 | Hilbrink et al. | |
| 2013/0054951 A1 | 2/2013 | Liu et al. | |
| 2017/0118520 A1 | 4/2017 | Wu et al. | |

FOREIGN PATENT DOCUMENTS

| | | |
|---|---|---|
| CN | 104469504 A | 3/2015 |
| CN | 104503788 A | 4/2015 |
| CN | 105227984 A | 1/2016 |
| CN | 105657551 A | 6/2016 |
| CN | 105704553 A | 6/2016 |

OTHER PUBLICATIONS

The Chinese First Examination Report of corresponding Chinese application No. 201610513331.4, dated Aug. 24, 2018.
The Chinese Second Examination Report of corresponding Chinese application No. 201610513331.4, dated May 27, 2019.

* cited by examiner

METHOD FOR TELEVISION REMOTE KEYPRESS RESPONSE BASED ON ANDROID OPERATING SYSTEM AND TELEVISION THEREOF

CROSS-REFERENCE TO RELATED APPLICATIONS

This application is a continuation of U.S. patent application Ser. No. 15/387,440, filed on Dec. 21, 2016, which claims priority to Chinese Patent Application No. 201610513331.4, filed on Jul. 1, 2016 and entitled "METHOD FOR TELEVISION REMOTE KEYPRESS RESPONSE BASED ON ANDROID OPERATING SYSTEM AND TELEVISION THEREOF", the entirety of all of which are incorporated by reference herein.

TECHNICAL FIELD

This application relates to TV technology, and particularly, to a method for television (TV) remote keypress response based on Android operating system (OS) and a TV thereof.

BACKGROUND

Compared to traditional TVs, smart TVs provide users with richer features to meet the users' needs to watch TV programs, use a variety of applications provided by smart TV, and more. Smart TVs support these various functions through a built-in operating system (OS), such as an Android OS. When the user turns on the smart TV, the OS starts at the same time.

In related art, the OS takes the longest time during the process of starting a smart TV. To mitigate the sub-optimal experience brought to the user by the extended OS booting time, some images and videos or the like will be displayed on the smart TV screen throughout the startup process of the OS. During this process, since keypress events received by the smart TV need to be assigned to running applications on upper layers for processing, if the user presses a certain key on the remote control of the smart TV, e.g., the volume-down key, the smart TV system will not respond to the key operation until the smart TV system has been initialized, and the applications have been started. That is, the TV will not perform the corresponding operation according to the user's instruction, and the only option left for the user is to watch it or wait for it.

SUMMARY

This application provides a method for method for television (TV) remote keypress response based on Android operating system (OS) and a TV thereof.

A first aspect of the present application provides a method for TV remote keypress response based on Android OS, and includes:

creating a first process when the Android OS is being initialized;

execute the first process to obtain a key value of a remote keypress event; and perform a remote keypress operation according to the key value.

A second aspect of the present application provides a TV, including:

a memory storing instructions; a processor coupled with the memory and configured to execute the instructions stored in the memory, and the processor is configured to:

create a first process when the Android OS is being initialized; and execute the first process to obtain a key value of a remote keypress event; and perform a remote keypress operation according to the key value.

BRIEF DESCRIPTION OF DRAWINGS

A brief introduction will be given hereinafter to the accompany drawings which will be used in the description of the present application or related art in order to explain the technical solutions of the present application or related art more clearly. Apparently, the drawings in the description below are merely illustrating some embodiments of the present application. Those skilled in the art may obtain other drawings according to these drawings without paying any creative labor.

DETAILED DESCRIPTION

In order to make the purposes, the technical solutions and the advantages of the present application more apparent, a clear and comprehensive description will be given to the technical solution of the present application with reference to the accompanying drawings. Obviously, the described embodiments are only part of the embodiments of the present application, rather than all of them. According to the embodiments of the present application, all of the other embodiments obtained by those with ordinary skill in the art without consuming any creative work fall within the protection scope of the present application.

Figure 1:
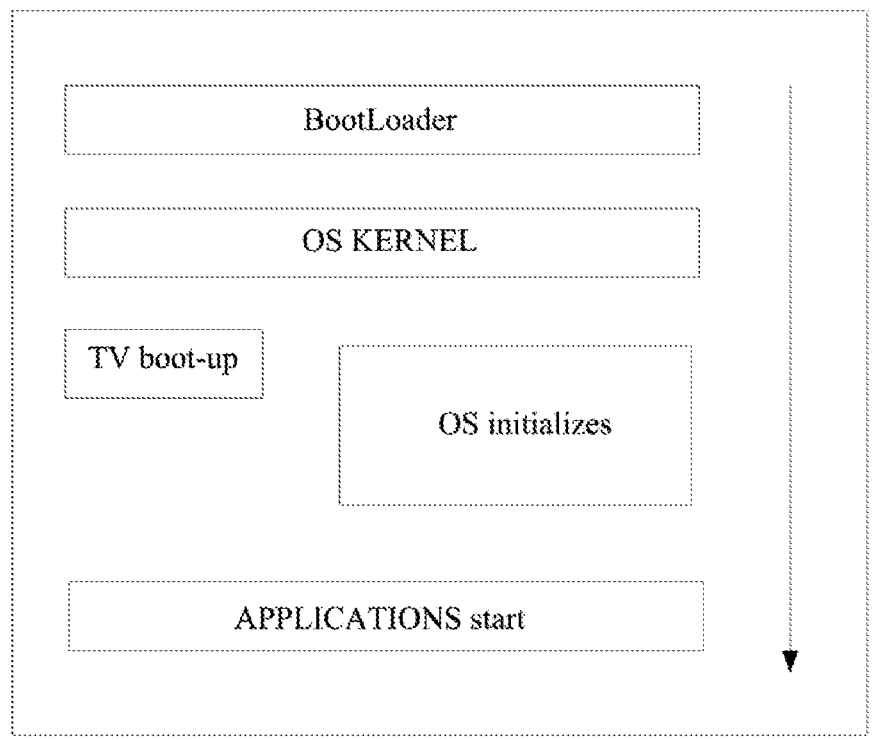
FIG. 1 is a schematic diagram of the start-up of a TV with Android OS installed.

FIG. 1 is a schematic diagram of the start-up of a TV with Android OS installed. As depicted in FIG. 1, when turned on, the TV starts from running a BootLoader, i.e., the boot loader after the startup of TV. Then, the booting, or start-up, of the TV begins. During the starting up, the TV mainly deals with a variety of input and output signals of TV. When the TV is booting, the OS begins to start up. Only after the start-up of OS is complete will the applications of the upper layers begin to start up, thus completing the start-up of TV. In related art, if the user presses a key on the remote control while the TV is still booting, the TV will not respond to the instruction of the user because the TV can only respond to the instructions of the user after the upper layer applications of the TV have been up and running.

In related art, a remote control signal may be received at the TV when the user presses a key on the remote control after upper layer applications have been started, and the key value corresponding to the remote control signal is parsed by a WindowManagerServer and distributed to a corresponding application, such as a currently running application. Then, the keypress will be handled and responded in an OnKey-Down or OnKeyUp event by the application to which the key-press is assigned to. That is, in related art, a remote keypress is not responded to or handled until an application of the TV has been started. Hence, no response can be made to the remote keypress while the application is yet to be started when the TV is still in the booting process.

Figure 2:
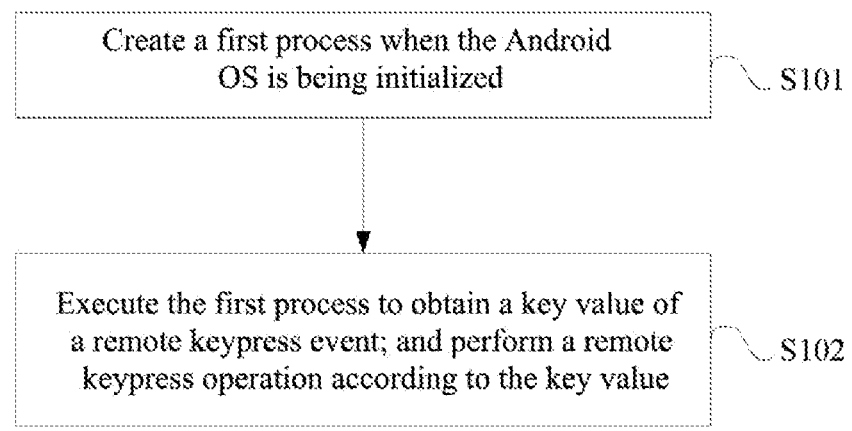
FIG. 2 is a flowchart of a method for TV remote keypress response based on Android OS provided in some embodiments of the present application.

FIG. 2 is a flowchart illustrating a method for TV remote keypress response based on Android OS provided in some embodiments of the present application. As depicted in FIG. 2, the method includes:

S101: create a first process when the Android OS is being initialized.

It should be noted that, as for the remote keypress response after the start-up of the TV, any keypress response method in related art may be used, and the method of the embodiments of the present application is applied to the remote keypress response during the start-up process of the TV.

As an example, the remote control may emit a remote control signal by means of infrared or Bluetooth and the like after the user presses a key on the remote control during startup of TV. After being received at the remote control receiver of the TV, the remote control signal is handled by a driver interrupt that converts the analog signal corresponding to the remote control signal into a digital signal and store the digital signal under a specific directory in the Android OS. The digital signal may be treated as an event of an external device. This specific directory may be, for example, an input device directory (i.e. /dev/input) under the device directory in the Android OS, which is used to store signal inputs from external devices, such as signals corresponding to a remote control, keyboard, mouse, etc. Each subdirectory under the directory corresponds to an input signal from an external device, that is, each subdirectory is used to store an event for an external device, where the input signal of the remote control may be a remote keypress event, the input signal of a keyboard may be a keyboard keypress event, and the input signal of a mouse can be a mouse keypress event. Therefore, each subdirectory may be seen as a device node. It should be noted that an external device may provide a plurality of signal inputs at the same time, so a device may correspond to a plurality of device nodes under the /dev/input.

For example, after the user presses the volume adjusting key on the remote control, the driver can convert the signal corresponding to the volume adjusting key into a digital signal, and then store the digital signal into the device node "event1" under /dev/input, thus the event saved in the device node event1 is "pressing the volume adjusting key on the remote control".

The above handling process can be carried out while the Android OS is being initialized, that is, the driver can obtain and store input signal from external devices during the process of starting up the Android OS.

Meanwhile, the first process may be created when the Android OS is being initialized. For example, the first process may be created at any moment during the process of playing the boot animation.

S102: execute the first process to obtain a key value of a remote keypress event; and perform a remote keypress operation according to the key value.

As described above, a remote keypress is only respond to by an application after the application of the TV has been started in the related art. In the startup process of TV, before the application starts up, the driver has completed its start-up. Even if the OS is still being started up, the driver can nonetheless properly get the remote control signal and store the same under the device node corresponding to the signal. Meanwhile, the first process has been created. On this basis, the first process may be executed. As an example, the first process may read a remote control signal saved under the device node, i.e., a remote keypress event, to parse the key value corresponding to the remote control signal and perform a remote keypress operation according to the key value. In this case, the first process may be a prior art process executed during the boot-strap process of the OS, with an operation corresponding to the keypress handling being added thereto. Alternatively, the first process may also be an additional special process dedicated to keypress handling. Whether being a modified prior art process or an additional process, the first process is executed during the initialization process of the Android OS to obtain the key value corresponding to the remote control signal and further perform the corresponding remote keypress operation according to the key value. Thus, response to the remote keypress during the process of TV start-up is implemented.

In embodiments of the present application, a first process is created and executed during the initialization process of the Android OS, so as to obtain a key value of a remote keypress event, and perform a remote keypress operation according to the key value. As with the first process, key value of the remote keypress event saved under the device node can be preemptively read during the initialization process of Android OS, thereby implementing the operation of responding to the keypress, without having to wait until the OS completes the start-up and the TV assigns received keypress to a running upper layer application for handling. Thus response to the remote keypress during the process of TV start-up is implemented, especially for the boot animation or video, so that users can interact with the TV by pressing keys, which greatly enhances the user's experience.

Figure 3:
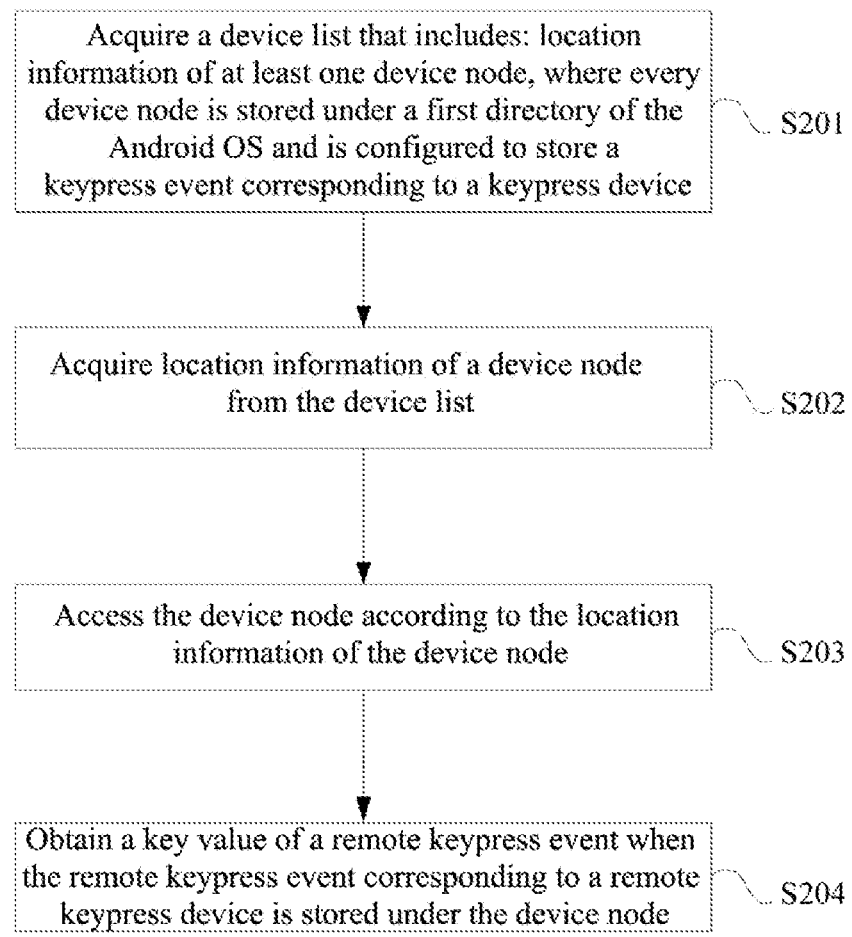
FIG. 3 is a flowchart illustrating a method for TV remote keypress response based on Android OS provided in some embodiments of the present application.

FIG. 3 is a flowchart illustrating a method for TV remote keypress response based on Android OS provided in some embodiments of the present application. As depicted in FIG. 3, an implementation for acquiring a key value of a remote keypress event is provided, and the above described S102 may include:

S201: acquire a device list that includes: location information of at least one device node, where every device node is stored under a first directory of the Android OS and is configured to store a keypress event corresponding to a keypress device.

In this case, the aforementioned first directory is the specific directory in the Android OS for storing the converted digital signal, and may be, e.g., /dev/input in the Android OS. In this case, the first directory stores at least one device node. When the first process is being executed, the first process may obtain location information registering each device node, such as a pointer to each device node, and the like. As an example, the acquiring a device list may be accomplished by acquiring a predefined device list, or acquiring a device list generated according to the location information of the device node under the first directory after acquiring the location information. By recording the location identifier of the device node in the device list, more convenience can be lent to subsequent determinations and handling works.

S202: acquire location information of a device node from the device list.

S203: access the device node according to the location information of the device node.

S204: obtain a key value of a remote keypress event when the remote keypress event corresponding to a remote keypress device is stored under the device node.

When accessing a device node under the first directory, a case may occur that the event stored under the device node is not a remote keypress event. For example, the event stored under the device node may be a mouse keypress event or a keyboard keypress event. Hence, when accessing a device node, it should be firstly determined whether a remote keypress event corresponding to the remote keypress device is stored under the device node. If a remote keypress event corresponding to the remote keypress device is stored under the device node, the key value of the remote keypress event is acquired from the device node. That is, the digital signal stored under the device node is parsed for acquiring the key value corresponding to the digital signal. If no remote keypress event corresponding to the remote keypress operation device is stored under the device node, it is treated as if the user did not perform any remote keypress operation. Thus, no subsequent processing will be executed, and step 202 will be repeated.

Considering that less keys are potentially used by a user while the Android OS is being initialized as compared to the case after TV has been started up, a possible implementation may impose limitation on the remote keys such that only when the user presses one of the predefined remote keys (the number of which may be one or more) and the first process has started, will the TV proceed to acquire the key value for the remote keypress event. If the key that the user presses is not a predefined remote key, the TV will not acquire the key value of the remote keypress event or perform any subsequent processing when the TV executes the first process. That is, if a remote keypress event corresponding to the remote keypress device is stored under the device node and the remote keypress event is an event of pressing a predefined remote keypress, the key value of the remote keypress event will be acquired from the device node when the TV executes the first process. In this way, it is possible to reduce invalid operations due to mis-operation by the user or the like, thereby avoiding a waste of system resources.

As an example, the remote control, as previously described, emits a remote control signal through infrared or Bluetooth. The signal is analog signal that is to be converted into a digital signal by the driver and stored under the device node. Such a digital signal stored under the device node corresponds to an event that includes three attributes, namely the type of the key device, the key state of the keypress event corresponding to the key device, and the key value of the keypress event corresponding to the key device. In this case, the type of the key device may include remote key, keyboard, mouse or the like. The key state includes: the key-up state or key-down state. That is, remote keypress events are classified according to whether the key is pressed down or released up. The key value of the remote keypress event, which is used to identify each key specifically, may be, e.g., "volume", number key "5", etc.

By executing the first process, the TV can acquire the attribute of the keypress event corresponding to the key device if a keypress event corresponding to the key device is stored under the device node, and determine whether the keypress event corresponding to the key device is the remote keypress event corresponding to the remote keypress device according to the type of the key device. Thus, when the keypress event corresponding to the key device is the remote keypress event corresponding to the remote keypress device, it will be determined whether the keypress event corresponding to the key device is the event for pressing a predefined remote key according to the key state of the keypress event corresponding to the key device and the key value of the keypress event corresponding to the key device. For example, when the predefined remote keypress is "volume", the above TV can determine whether the remote keypress event is an event for pressing "volume" when the first process is running on the TV, and if so, it is considered that the conditions of remote keypress event are met, thus the value of the event, namely the key value of the remote keypress event, is read from the device node. Furthermore, subsequent keypress handling is performed according to the key value.

It should be noted that, if there are a plurality of device nodes in the device list, the key value acquiring and keypress handling operations will need to be performed on all the device nodes one by one.

In this embodiment of the present application, the location information of the device node is recorded in the device list, which lends more convenience to subsequent determinations and handling works. Moreover, acquiring the key value by determining the attribute of the event can ensure correct access to the valid remote keypress value.

Some embodiments of the present application provide an implementation for performing remote keypress operations according to the key value, thus the above described S102 may include:

determine whether the key value of the aforementioned remote keypress event is a key value of a first key among predefined keys; and if so, call an interface corresponding to the key value of the first key to perform the remote keypress operation.

For example, as mentioned in above embodiments, fewer keys are potentially used by the user while the Android OS is being initialized as compared to the case after TV has been started up. Hence, a limitation may be imposed on the remote keys such that only when the user presses one of the predefined remote keys and the first process is running will the key value for the remote keypress event be acquired, and the interface corresponding to the key be called for subsequent processing. If the key that the user presses is not a predefined remote key, the TV will not perform any subsequent processing when the TV executes the first process. Thus, it is possible to reduce invalid operations due to mis-operation by the user or the like, thereby avoiding a waste of system resources.

As a possible implementation, the key value of the first key is the key value corresponding to the volume adjusting key.

During the start-up process of the TV, images and/or videos or the like are often displayed. When it is a video that is being displayed, a potential problem might be that the volume is too loud or too low. Therefore, by assigning the volume adjusting key to the key value of the first key, the TV can respond to the user when the user presses the volume adjusting key during the start-up process of the TV, thereby accomplishing response to user keypress.

As a possible implementation, the key value of the first key may be configured by the user.

As an example, the user can set which remote keypresses may be responded to during the start-up process of TV by utilizing a setting function provided by the TV, so as to improve flexibility of setting the key value of the first key.

For example, the user may configure channel keys, up and down arrow keys, number keys and so on.

Figure 4:
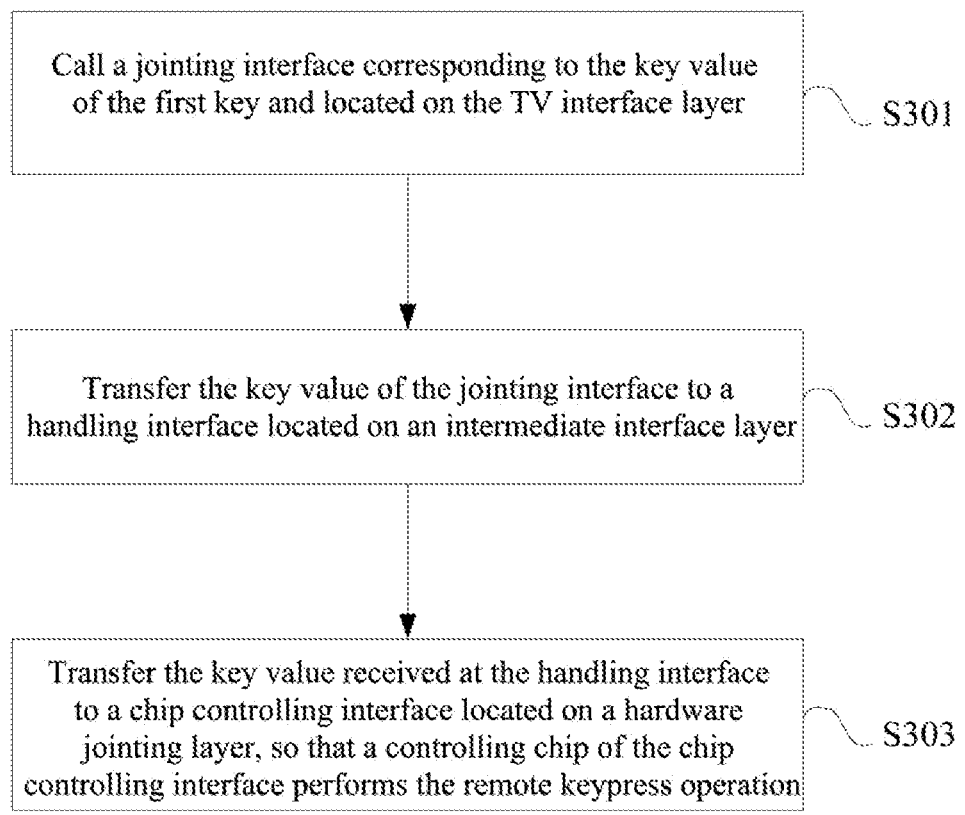
FIG. 4 is a flowchart illustrating a method for TV remote keypress response based on Android OS provided in some embodiments of the present application.

FIG. 4 is a flowchart illustrating a method for TV remote keypress response based on Android OS provided in some embodiments of the present application. As depicted in FIG. 4, an implementation for calling an interface corresponding to the key value of the first key to perform remote keypress operation is provided.

S301: call a jointing interface corresponding to the key value of the first key and located on the TV interface layer.

S302: transfer the key value of the jointing interface to a handling interface located on an intermediate interface layer.

S303: transfer the key value received at the handling interface to a chip controlling interface located on a hardware jointing layer, so that a controlling chip of the chip controlling interface performs the remote keypress operation.

In the embodiment of the present application, three interface layers are provided, which are, from top to bottom: a TV interface layer, an intermediate interface layer and a hardware jointing layer, with each layer providing a plurality of interfaces. Among these, the TV interface layer is the topmost layer interface used for the call from the first process. When the first process of the TV is executed and the key value of the first key is determined, it will begin from connecting to the jointing interface, and then the key value of the first key is passed on to the handling interface on the intermediate interface layer. The handling interface processes the key value, and pass on the handling results to the chip controlling interface on the hardware jointing layer. Further, the chip controlling interface triggers the underlying chip to perform the eventual key response.

As a possible implementation, the above described first process may be, for example, a BootAnimation process.

During the start-up process of the TV, the startup of OS takes the longest time. In order to mitigate the sub-optimal experience brought to the user by the extended OS booting time, a BootAnimation process will be performed during the startup process of OS in order to display changing images, progress bars or videos. In the present application, a handling process for responding to a keypress is added to the BootAnimation process of related art, thus implementing remote keypress response during the TV start-up process. By adding to the BootAnimation of related art the handling process for keypress responding, there will be no need to add and start any new process, which can improve the executing efficiency of the system and reduce system resource overhead.

Figure 5:
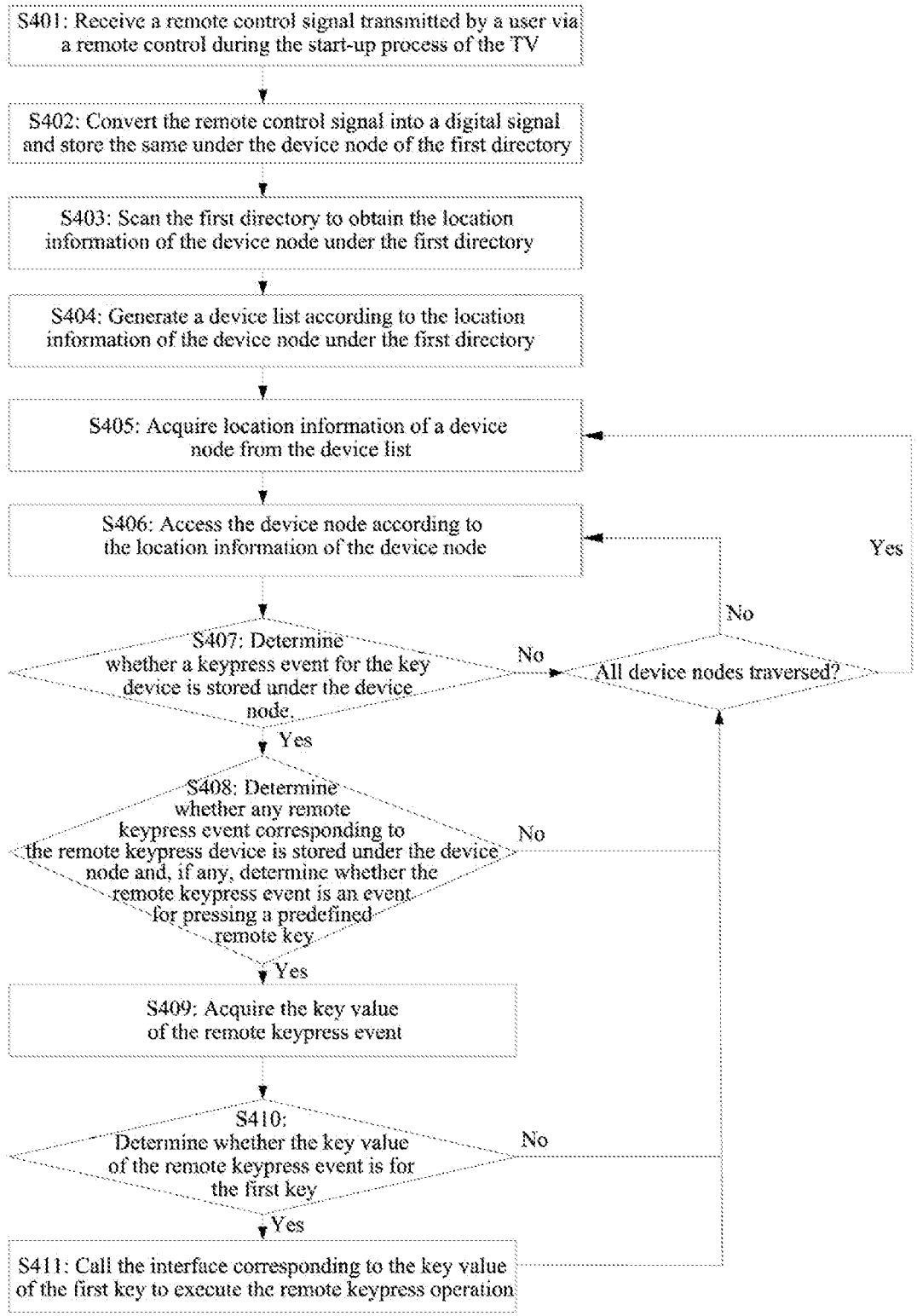
FIG. 5 is a flowchart of a method for TV remote keypress response based on Android OS provided in some embodiments of the present application.

FIG. 5 is a flowchart of a method for TV remote keypress response based on Android OS provided in some embodiments of the present application. As depicted in FIG. 5, the work flow includes:

S401: receive a remote control signal transmitted by a user via a remote control during the start-up process of the TV.

S402: convert the remote control signal into a digital signal and store the same under the device node of the first directory.

S403: scan the first directory to obtain the location information of the device node under the first directory.

S404: generate a device list according to the location information of the device node under the first directory.

S405: acquire location information of a device node from the device list.

S406: access the device node according to the location information of the device node.

S407: determine whether a keypress event corresponding to the key device is stored under the device node. If so, execute S408.

If otherwise, determine whether all device nodes have been traversed. If so, the process proceeds to step S405. If negative, access the next device node according to step S406.

S408: determine whether any remote keypress event corresponding to the remote keypress device is stored under the device node and, if any, determine whether the remote keypress event is an event for pressing a predefined remote key. If it is, the process proceeds to step S409.

If otherwise, determine whether all the device nodes have been traversed. If so, the process proceeds to step S405. If otherwise, the operation of S406 is carried on for the next device node.

S409: acquire the key value of the remote keypress event.

S410: determine whether the key value of the remote keypress event is a key value of the first key, and if so, S411 is performed.

If otherwise, determine whether all the device nodes have been traversed. If so, the process proceeds to step S405. If otherwise, the operation of S406 is carried on for the next device node.

S411: call the interface corresponding to the key value of the first key to execute the remote keypress operation.

Figure 6:
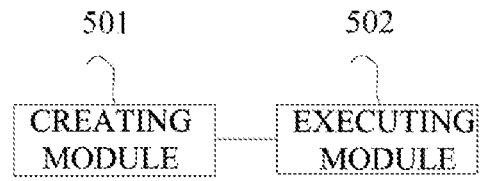
FIG. 6 is a block diagram of a TV provided in some embodiments of the present application.

FIG. 6 is a block diagram of a TV provided in some embodiments of the present application. As depicted in FIG. 6, the TV includes:

a creating module 501, configured to create a first process when the Android OS is being initialized.

As an example, the remote control may emit a remote control signal by means of infrared or Bluetooth and the like after the user presses a key on the remote control during startup of TV. After being received at the remote control receiver of the TV, the remote control signal is handled by an interrupt of a receiving module that converts the analog signal corresponding to the remote control signal into a digital signal and stores the digital signal under a specific directory in the Android OS. The digital signal may be treated as an event of an external device. This specific directory may be, for example, an input device directory (i.e. /dev/input) under the device directory in the Android OS, which is used to store signal inputs from external devices, such as signals corresponding to a remote control, keyboard, mouse, etc. Each subdirectory under the directory corresponds to an input signal from an external device, that is, each subdirectory is used to store an event for an external device, where the input signal of the remote control may be a remote keypress event, the input signal of a keyboard may be a keyboard keypress event, and the input signal of a mouse can be a mouse keypress event. Therefore, each subdirectory may be seen as a device node. It should be noted that an external device may provide a plurality of signal inputs at the same time, so a device may correspond to a plurality of device nodes under the /dev/input.

For example, after the user presses the volume adjusting key on the remote control, the driver can convert the signal corresponding to the volume adjusting key into a digital signal, and then store the digital signal into the device node "event1" under /dev/input, thus the event saved in the device node event1 is "pressing the volume adjusting key on the remote control".

The above handling process can be carried out while the Android OS is being initialized, that is, the driver can obtain and store input signal from external devices during the process of starting up the Android OS.

Meanwhile, the first process may be created when the Android OS is being initialized. For example, the first process may be created at any moment during the process of playing the boot animation.

An executing module 502, configured to execute the first process described above which is used for periodically acquiring device node information and performing a remote keypress response operation according to the remote keypress event included in the device node.

As described above, a keypress is only respond to by an application after the application of the TV has been started in the related art. In the startup process of TV, before the application starts up, the driver has completed its start-up. Even if the OS is still being started up, the driver can nonetheless properly get the remote control signal and store the same under a device node. Meanwhile, the first process has been created. On this basis, the first process will be executed. As an example, the first process periodically acquires device node information and performs a remote keypress response operation according to the remote keypress event included in the device node. In this case, the first process may be a prior art process executed during the boot-strap process of the OS, with an operation corresponding to the keypress handling being added thereto. Alternatively, the first process may also be an additional special process dedicated to keypress handling. Whether being a modified prior art process or an additional process, the first process is executed during the initialization process of the Android OS to obtain the key information corresponding to the remote control signal and further perform the corresponding keypress handling according to the key information. Thus, response to the remote keypress during the process of TV start-up is implemented.

In embodiments of the present application, a first process is created and executed during the initialization process of the Android OS, which is configured to periodically acquire device node information and perform a remote keypress response operation according to the remote keypress event included in the device node, thereby realizing responding to the remote keypress during the process of TV start-up and enhancing user experience.

Figure 7:
FIG. 7 is a block diagram of a TV provided in some embodiments of the present application.

FIG. 7 is a block diagram of a TV provided in some embodiments of the present application. As depicted in FIG. 7, the executing module 502 includes:

a scanning unit 5021, configured to scan a device node under a first directory, and store any found device node in a device list.

In this case, the first directory is the above described directory for storing the converted digital signal, and may be, e.g., /dev/input in the Android OS. When being executed, the first process leverages scanning unit 5021 to continuously scan for device node under the first directory and store any found device node in the device list. That is, the device list is updated every time the first directory is scanned through. By recording the scanning result in a specific device list, more convenience can be lent to subsequent determinations and handling works.

A first acquiring unit 5022 is configured to acquire key information corresponding to a device node in the device list.

Occasionally, it might occur that no device node is found after the scanning for device node. For example, if the TV does not have an external device, or if none of the external devices is offering any input signal, no device node will be found under the first directory, hence no device node information will be found in the device list.

Therefore, after scanning through the device nodes, the step immediately next is to determine whether any device node exists in the device list, and if not, it will be treated as if the user did not performed any remote keypress operation, and hence there is no need to perform any subsequent processing. Then, a next round of scanning begins. If a device node exists in the device list, the key information in the device node will be acquired.

As an example, the remote control, as previously described, emits a remote control signal through infrared or Bluetooth. The signal is analog signal that is to be converted into a digital signal by the driver and stored under the device node. Such a digital signal stored under the device node corresponds to an event that includes three attributes, namely an event type, key-up/down, and an event value. In this case, the event type includes remote keypress event, keyboard event, mouse event and so on. The information corresponding to a remote keypress event is the key information. Remote keypress events are classified according to whether the key is released up or pressed down. For a remote keypress event, its event value is used for identifying the specific key, which may be, e.g., "volume", number key "5", etc.

A second acquiring unit 5023 is configured to acquire the key value of a remote keypress event when the key information meets the conditions of the predefined remote keypress event, where the conditions of the remote keypress event include: the remote keypress event is the event for pressing down a predefined key.

When the key information is acquired, it is assessed whether the key information conforms to a predefined condition. That is, the remote keypress event is the event of pressing down a predefined key. For example, it is determined whether the remote keypress event is an event for pressing down the "volume" key, and if so, it is considered that the condition of the remote keypress event is met. After the condition of the remote control key is met, the value of the event is acquired, i.e., the key value of the remote keypress event is acquired. Furthermore, subsequent keypress handling is performed according to the key value.

It should be noted that, if there are a plurality of device nodes in the device list, the key value acquiring and keypress handling operations will need to be performed on all the device nodes one by one.

In this embodiment of the present application, the information of the device node is recorded in the device list, which lends more convenience to subsequent determinations and handling works. Moreover, acquiring the key value by determining the attribute information of the event can ensure correct access to the valid remote keypress value.

Figure 8:
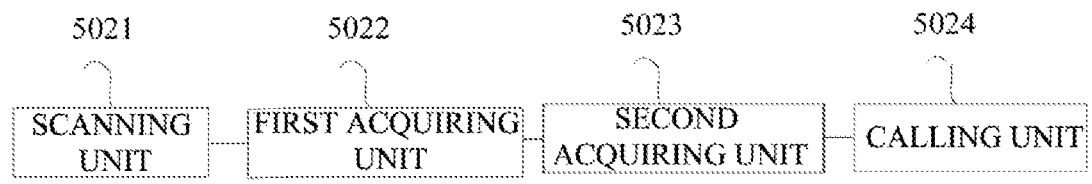
FIG. 8 is a block diagram of a TV provided in some embodiments of the present application.

FIG. 8 is a block diagram of a TV provided in some embodiments of the present application. As depicted in FIG. 8, the executing module 502 further includes:

a calling unit 5024, configured to determine whether the key value of the aforementioned remote keypress event is the key value of the first key, and if so, call the interface corresponding to the key value of the first key to perform keypress handling.

For example, since less keys are potentially used by the user while the Android OS is being initialized as compared to the case after TV has been started up, this embodiment imposes a limitation on the remote keys, such that only when the user presses one of the keys enabled by the TV will the first process call up the interface corresponding to the key for subsequent processing. And if the user presses a key that is disabled by the TV, the first process will not proceed to any subsequent processing. Thus, it is possible to reduce invalid operations due to mis-operation by the user or the like, thereby avoiding a waste of system resources.

As a possible implementation, the aforementioned key value of the first key is the key value corresponding to the volume adjusting key.

During the start-up process of the TV, images and/or videos or the like are often displayed. When it is a video that is being displayed, a potential problem might be that the volume is too loud or too low. In the embodiment of the present application Therefore, the volume adjusting key is assigned to the key value of the first key, allowing the TV to respond to the user when the user presses the volume adjusting key during the start-up process of the TV, thereby accomplishing response to user keypress.

As a possible implementation, the key value of the first key may be configured by the user.

As an example, the user can set which remote keypresses may be responded to during the start-up process of TV by utilizing a setting function provided by the TV, so as to improve flexibility of setting the key value of the first key. For example, the user may configure channel keys, up and down arrow keys, number keys and so on.

As a possible implementation, the above described first process may be a BootAnimation process.

During the start-up process of the TV, the startup of OS takes the longest time. In order to mitigate the sub-optimal experience brought to the user by the extended OS booting time, a BootAnimation process will be performed during the startup process of OS in order to display changing images, progress bars or videos. In the present application, a handling process for responding to a keypress is added to the BootAnimation process of related art, thus implementing remote keypress response during the TV start-up process. By adding to the BootAnimation of related art the handling process for keypress responding, there will be no need to add and start any new process, which can improve the executing efficiency of the system and reduce system resource overhead.

As a possible implementation, the third determining unit 5024 is configured to:

call a jointing interface corresponding to the key value of the first key and located on the TV interface layer; transfer the key value of the jointing interface to a handling interface located on an intermediate interface layer; and transfer the key value received at the handling interface to a chip controlling interface located on a hardware jointing layer, so that a controlling chip of the chip controlling interface performs the remote keypress operation.

In the embodiment of the present application, three interface layers are provided, which are, from top to bottom: a TV interface layer, an intermediate interface layer and a hardware jointing layer, with each layer providing a plurality of interfaces. Among these, the TV interface layer is the topmost layer interface used for the call from the first process. After the first process determines the key value of the first key, it will start from connecting to the jointing interface, and then the key value of the first key is passed on to the handling interface on the intermediate interface layer. The handling interface performs the handling work for the key value of the first key, and passes on the handling result to the chip controlling interface on the hardware jointing layer, allowing the chip controlling interface to trigger the underlying chip to perform the eventual key response.

The present application further provides a TV that comprises: a memory storing instructions; a processor coupled with the memory and configured to execute the instructions stored in the memory, and the processor is configured to: create a first process when the Android OS is being initialized; execute the first process to obtain a key value of a remote keypress event; and perform a remote keypress operation according to the key value.

The processor in the TV of the present embodiment may be further configured to perform any of the methods for TV remote keypress response provided in the foregoing embodiments of the present application following similar implementation principals which will be repeated herein.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing embodiment methods are performed. The foregoing storage medium includes various mediums capable of storing program codes, such as a ROM, a RAM, a magnetic disk, or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. A method for responding to a remote keypress, the method comprising:

during at least a portion of an operating system initialization process executing on a television, receiving, by the television, a remote key event;

during at least the portion of the operating system initialization process executing on the television, executing a first process in response to the remote key event, wherein the first process comprises determining a key value corresponding to the remote key event, wherein the determining a key value corresponding to the remote key event comprises:

obtaining a device list;

obtaining location information of at least one device node included in the device list, wherein each device node is stored under a first directory of the operating system for storing a key event corresponding to a key device;

determining location information of a device node from the device list;

accessing the device node according to the location information of the device node;

determining whether the remote key event is stored under the device node; and in response to the remote key event being stored under the device node, obtaining the key value of the remote key event; and performing, by the television, a remote keypress operation according to the key value.

2. The method according to claim 1, wherein the remote key event is an event triggered by pressing a predefined key on a remote control.

3. The method according to claim 2, further comprising:
acquiring an attribute of the key event corresponding to the key device, wherein the attribute of the key event corresponding to the key device comprises: a type of the key device.

4. The method according to claim 3, wherein the attribute of the key event further comprises: a key state and a key value, wherein the key state comprises: a keyup state or a keydown state.

5. The method according to claim 3, wherein the determining whether the remote key event is stored under the device node comprises:
determining whether the key event corresponding to the key device is the remote key event according to a type of the key device.

6. The method according to claim 1, wherein the obtaining a device list comprises:
scanning the first directory of the operating system to obtain the location information of the device node under the first directory; and
generating the device list according to the location information of the device node under the first directory.

7. The method according to claim 1, wherein the first directory is an input device directory under the device directory of the operating system.

8. The method according to claim 1, wherein the first process comprises a BootAnimation process.

9. A television (TV), comprising:
a memory storing instructions;
a processor in communication with the memory, and wherein the processor is configured to execute the instructions stored in the memory to:
during at least a portion of an operating system initialization process executing on the television, receive a remote key event;
during at least the portion of the operating system initialization process executing on the television, execute a first process in response to the key event;
execute the first process to determine a key value corresponding to the remote key event by:
obtaining a device list;
obtaining location information of at least one device node included in the device list, wherein each device node is stored under a first directory of the operating system for storing a key event corresponding to a key device;
determining location information of a device node from the device list;
accessing the device node according to the location information of the device node;
determining whether the remote key event is stored under the device node; and
in response to the remote key event being stored under the device node, obtaining the key value of the remote key event; and
perform a remote keypress operation according to the key value.

10. The TV according to claim 9, wherein the processor is further configured to:
acquire an attribute of the key event corresponding to the key device, wherein the attribute of the key event corresponding to the key device comprises: a type of the key device.

11. The TV according to claim 10, wherein the attribute of the key event further comprises a key state and a key value, wherein the key state comprises: a keyup state or a keydown state.

12. The TV according to claim 10, wherein the processor is configured to perform said determining whether the remote key event is stored under the device node by:
determining whether the key event corresponding to the key device is the remote key event according to a type of the key device.

13. The TV according to claim 9, wherein the processor is configured to perform the obtaining a device list by:
scanning the first directory of the operating system to obtain the location information of the device node under the first directory; and
generating the device list according to the location information of the device node under the first directory.

14. The TV according to claim 9, wherein the first directory is an input device directory under the device directory of the operating system.

15. The TV according to claim 9, wherein the key value of the remote key event comprises a key value for indicating volume up.

16. The TV according to claim 9, wherein the key value of the remote key event comprises a key value for indicating volume down.

* * * * *